United States Patent [19]

Mottur et al.

[11] Patent Number: 4,923,705

[45] Date of Patent: May 8, 1990

[54] CONTINUOUS METHOD FOR MAKING KETTLE STYLE POTATO CHIPS

[75] Inventors: George P. Mottur, Danville; Hilbert J. Cope, Jr.; Dennis L. Kishbaugh, both of Berwick; Michael J. Luebbers, Danville; Norman E. Peters, Berwick, all of Pa.

[73] Assignee: Borden, Inc., Columbus, Ohio

[21] Appl. No.: 251,354

[22] Filed: Sep. 30, 1988

[51] Int. Cl.$^5$ .............................................. A23L 1/217
[52] U.S. Cl. .................................. 426/438; 426/519; 426/808
[58] Field of Search ............... 426/637, 438, 441, 519, 426/808; 99/409

[56] References Cited

U.S. PATENT DOCUMENTS

| | | | |
|---|---|---|---|
| 1,140,945 | 12/1921 | Morris | 99/406 |
| 2,085,494 | 6/1937 | Ferry | 99/405 |
| 2,186,345 | 1/1940 | Reidenbach . | |
| 2,231,114 | 2/1941 | Ferry | 99/405 |
| 2,611,705 | 9/1952 | Hendel . | |
| 2,812,254 | 11/1957 | Smith . | |
| 3,244,538 | 4/1966 | Kaehler . | |
| 3,282,197 | 11/1966 | Smith | 99/405 |
| 3,641,924 | 2/1972 | Sijbring | 99/406 |
| 3,696,735 | 10/1972 | Boertje et al. | 99/404 |
| 3,708,311 | 1/1973 | Bolton et al. . | |
| 3,754,468 | 8/1973 | Wright et al. | 99/403 |
| 3,787,594 | 1/1974 | Palmason | 426/438 |
| 3,794,745 | 2/1974 | Boertje et al. | 426/439 |
| 3,934,046 | 1/1976 | Weaver et al. | 426/418 |
| 4,020,189 | 4/1977 | Wright et al. | 426/438 |
| 4,234,612 | 11/1980 | Sakakibara et al. | 426/394 |
| 4,366,749 | 1/1983 | Caridis et al. | 99/339 |
| 4,392,420 | 7/1983 | Caridis et al. | 99/406 |
| 4,488,478 | 12/1984 | Leeper | 99/330 |
| 4,491,602 | 1/1985 | Miller | 426/438 |
| 4,503,127 | 3/1985 | Fan et al. | 426/438 |
| 4,537,786 | 8/1985 | Bernard | 426/438 |
| 4,706,556 | 11/1987 | Wallace et al. | 99/330 |
| 4,738,193 | 4/1988 | Benson et al. | 99/404 |
| 4,741,912 | 5/1988 | Katz et al. | 426/438 |
| 4,844,930 | 7/1989 | Mottur et al. | 426/438 |

FOREIGN PATENT DOCUMENTS

| | | | |
|---|---|---|---|
| 0065791 | 1/1982 | European Pat. Off. . | |
| 0260029A2 | 3/1988 | European Pat. Off. | 426/438 |
| 2247122 | 3/1974 | Fed. Rep. of Germany . | |
| 2170396A | 8/1986 | United Kingdom | 426/473 |

OTHER PUBLICATIONS

"MacBeth Introducing New Fryer", *Chipper/Snacker*, vol. 64, Jun. 1987.

*Primary Examiner*—Arthur L. Corbin
*Attorney, Agent, or Firm*—Venable, Baetjer, Howard & Civiletti

[57] ABSTRACT

A continuous method for making potato chips is disclosed. The method comprises conveying uncooked, unwashed potato slices through a pre-frying zone with agitation to form a dehydrated skin on the slices; conveying the slices through a second zone to form pliable, shape-holding potato slices; conveying the slices through a third zone to produce rigid, completely fried potato chips; and removing the completely fried chips. A method for operating a continuous frying apparatus is also disclosed. The potato chips prepared in accordance with the disclosed methods are described.

19 Claims, 1 Drawing Sheet

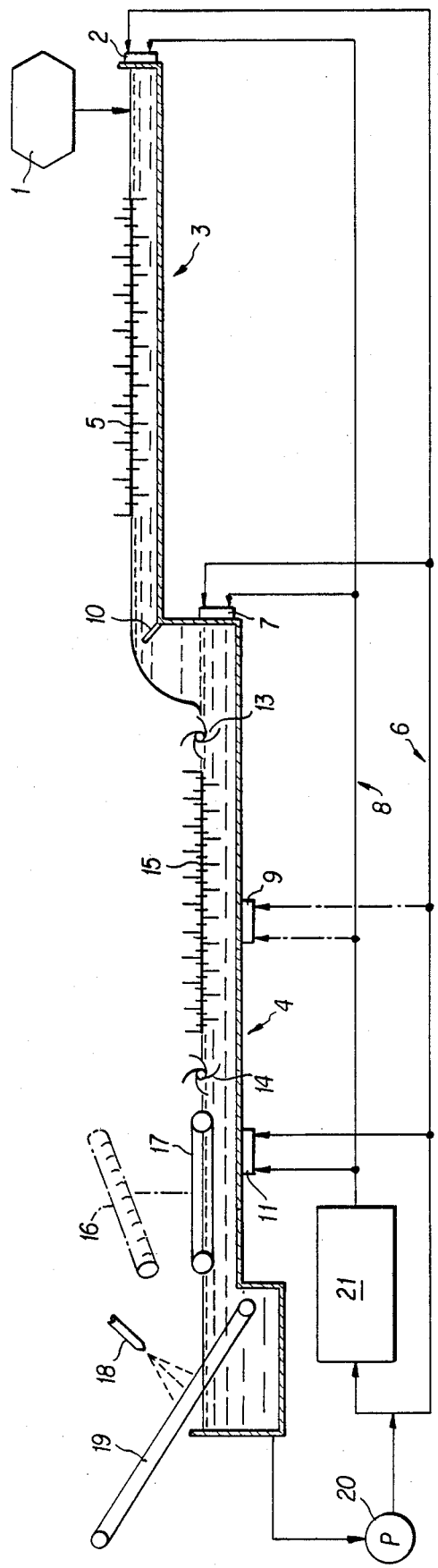

CONTINUOUS METHOD FOR MAKING KETTLE STYLE POTATO CHIPS

BACKGROUND OF THE INVENTION

The present invention relates generally to the production of potato chips and other food products prepared by deep-fat frying, and is particularly concerned with a continuous frying method for making potato chips which are similar in taste and texture to those produced by the slow-cooked batch or kettle process. In a particular embodiment, the invention relates to a process whereby reduced-oil potato chips are made.

Large scale commercial production of potato chips is usually carried out in a continuous frying apparatus in about 3 to about 3.5 minutes at temperatures between about 300° F (about 149° C) and about 360° F (about 182° C). If all or a portion of the frying process is carried out below about 290° F (about 143° C), for a period of about 7 to about 11 minutes, a distinctly different chip results. The chip produced by the lower temperature process is harder and crunchier, and its surface takes on a more bubbly appearance. In addition, the flavor is somewhat blander than that of a regular potato chip, and there is a more pronounced oiliness to the mouth feel. These characteristics are deemed very desirable by many producers and consumers of potato chips. Since the original method of making this type of chip was by the batch, in relatively small vessels of oil heated directly over a flame, the chips were termed "kettle style".

Unfortunately, the batch process is very labor intensive and requires manual agitation as with a rake to avoid clumping and to attain dunking for evenness of frying. Furthermore, it can produce only small quantities of finished product, typically between 50 and 200 pounds per hour per kettle. By contrast, large scale potato chip producers typically employ continuous fryers capable of producing on the order of 1,000 to 5,000 pounds per hour of finished product. The kettle or batch process is therefore uneconomical for large scale manufacturers.

For a number of reasons, it has been problematic to obtain desirable qualities of kettle style potato chips in chips produced by conventional continuous fryers. In a typical continuous fryer, raw potato slices are introduced at one end of an elongated vessel or trough containing heated frying oil. While immersed in the oil, the potato slices are carried toward the opposite end of the vessel by mechanical conveying devices or more commonly by the velocity of the oil itself. Frying takes place as the water in the potato slices is driven out and replaced with oil, and the completely fried chips are removed when they reach the end of the vessel. In order to maximize the production rate and reduce sticking between the potato slices, high temperatures are utilized and the residence time of the slices in the frying oil can be held to a minimum. These conditions result in a chip with a taste and texture different from that of kettle style chips.

Continuous fryers are also characterized by a temperature gradient in the oil bath which decreases continually from a maximum value at the entrance end of the fryer, where the oil is typically admitted after being heated by a heat exchanger or other type of heat source, and the exit end where the oil is withdrawn for reheating and recirculation. By contrast, the time-temperature profile in the kettle or batch process is more complex, initially decreasing as the relatively large amount of water in the raw potato slices absorbs heat from the oil and then increasing after most of the water has been vaporized and driven out. This is another factor which accounts for the differences between potato chips produced by the kettle process and those produced by continuous fryers.

A particular type of kettle style chips has been produced which have an especially crisp texture and which retain more intrinsic potato flavor after frying. These chips are prepared by frying uncooked potato slices for a particularly long period of time at relatively low temperatures without previously washing the slices to remove surface starch and other surface components. However, the unwashed slices are exceeding sticky, particularly when fried at low temperatures. Conventional continuous fryers typically provide neither enough vertical frying area to allow for longer frying times nor sufficient agitation in the appropriate region to counteract agglomeration of sticky slices. In fact, agglomeration of 85% by weight of fried potato chips is not uncommon. Agglomeration above about 2% by weight, however, is unacceptable because agglomerated clusters of potato chips are unable to fry out sufficiently.

SUMMARY OF THE INVENTION

The present invention provides a method for making kettle style potato chips from unwashed, uncooked potato slices using a continuous fryer. The potato chips produced in accordance with this invention may, in one embodiment, have an oil content about 25% lower by weight than other available kettle style chips.

In one aspect, the invention relates to a continuous method for making potato chips by conveying unwashed potato slices through a heated liquid frying medium, such as peanut oil. The first step of the method comprises conveying uncooked, unwashed potato slices through a first, pre-frying zone at a maximum temperature in the range of from above about 300° F (about 149° C) to about 320° F (about 160° C). In the first zone, the slices are subjected to agitation sufficient to prevent substantial agglomeration (i.e., about 2% or more by weight) in the finished potato chips for a time period sufficient to form a dehydrated skin on the surface of the slices. The so-treated potato slices are next conveyed through a second frying zone at a temperature in the range of about 240° F (about 116° C) to about 265° F (about 129° C), for a time period sufficient to impart a pliable shape-holding consistency to the slices. Next, the potato slices are conveyed through a third zone at a maximum temperature in the range of about 285° F (about 141° C) to about 310° F (about 154° C) for a time period sufficient to produce rigid, completely fried potato chips. The completely fried chips are now removed from the vessel. Optionally, additional oil may be supplied to the chips from a source external to the vessel, such as in the form of a spray or curtain, as the chips are conveyed out of the fryer. In this case, the oil content of the chips so produced will be in the range of about 34% to about 36% by weight. In a preferred embodiment, however, this supplemental oil addition step is omitted, and the oil content of the completely fried chips is in the range of about 23% to about 26% by weight, about 25% lower than prior art kettle style potato chips.

In another aspect, the invention pertains to a method for operating a continuous frying apparatus. The apparatus comprises an oil flume outfitted with agitating means (e.g., longitudinal paddle assemblies), which flume is for pre-frying uncooked, unwashed potato slices. The apparatus also comprises an elongated vessel having an entrance end for receiving pre-fried potato slices and an exit end from which completely fried potato chips are removed. The apparatus also includes means for supplying heated liquid frying medium (oil) to the vessel, and means for conveying potato slices lengthwise along the apparatus from the oil flume to the exit end of the apparatus. The method comprises, as a first step, introducing a first stream of oil into a first inlet port in the flume. Unwashed, uncooked potato slices are introduced into the oil flume, with agitation sufficient to prevent substantial agglomeration of the slices (i.e., about 2% or more by weight). A second stream of oil is introduced into the vessel through a second port, to define the start of a second zone, and potato slices exiting the flume are conveyed into this second zone. A third stream of oil is introduced into the vessel through a third port situated downstream of the second port to define the start of a third zone, and potato slices exiting the second zone are conveyed into this third zone. The flow rates and temperatures of each of these three zones are controlled such that the maximum temperature of the first zone is maintained within a certain temperature range, the second zone is maintained within a temperature range at least about 35° F (about 19° C) lower than the maximum temperature of the first range, and the maximum temperature of the third zone within a temperature range at least about 20° F (about 11° C) higher than the second range. Completely fried potato chips are removed from the exit end of the apparatus.

In yet another aspect, the invention pertains to potato chips prepared in accordance with the method of the invention which have increased crunchiness and more inherent potato flavor than prior art kettle chips.

BRIEF DESCRIPTION OF THE DRAWING

The Drawing FIG. is a schematic representation of a preferred embodiment of the process of the present invention.

DETAILED DESCRIPTION OF THE PREFERRED EMBODIMENTS

The schematic drawing figure represents a preferred embodiment of the invention. The drawing shows various features of the process which will be described in further detail hereinbelow, i.e., a slicer 1; an oil flume 3 outfitted with agitating means; an elongated fryer vessel 4 having a plurality of oil entry ports and equipped with various paddles capable of performing specific functions; a submerging conveyor 17; an optional oil spray 18; a take-out conveyor 19; an oil pump 20; and a heat exchanger 21 for heating oil external to the apparatus.

During the operation of the continuous frying apparatus, peeled potato slices preferably cut from a potato having a high dry matter (solids) content, i.e., about 15–25% by weight, preferably above about 18% and more preferably above about 20% by weight solids based on the weight of the potato (i.e., less than about 80% by weight of water), are used. Suitable potatoes include Atlantic, Mononas, Kennebec, Pennsylvania 657, Cloverdale, New York Superior, Pennsylvania Rosa and Norchip varieties. Preferred varieties include Atlantic, Mononas, Pennsylvania 657, and Norchip varieties having a high dry matter content. Preferably, potatoes having a high sugar content such as Russets or other baking varieties are not used because the chips which result have an undesirably dark color.

Peeling may be performed by any method commonly used in the art. For example, the potatoes may be washed in cold water and peeled by contact with a mechanical peeler which is a large cylinder comprised of rotating rollers, wherein the rollers are covered with an abrasive material capable of removing the potato skin from the potato.

The peeled potatoes are then conveyed to a slicer 1 where they are sliced to a desired thickness using, for example, an Urschel variable thickness slicer. The potatoes are sliced to a thickness in the range of about 0.060 inches to about 0.064 inches, and preferably about 0.062 inches thickness. The precise thickness used is a function of the solids content of the potatoes used. If the solids content is low, slices at the upper end of this range are used; if the solids content is higher, slightly thinner slices may be used.

In conventional frying processes, potato slices are next subjected to a washing step to remove surface starch therefrom. It is an essential feature of this invention, however, that the slices remain unwashed; the surface starch and other surface components which remain on the slices due to the omission of a wash step allows the finished potato chips to attain a much crisper texture and to retain more intrinsic potato flavor. By "unwashed" is meant that, subsequent to slicing, the potatoes are not washed. The whole potatoes may, in accordance with this invention, be washed prior to slicing. However, the presence of surface starch introduces a potential problem of stickiness which is addressed in the present process.

The unwashed, uncooked potato slices are now fed into the apparatus operated in accordance with this invention. Preferably, the slicer is positioned directly above the upstream end of the oil flume 3 such that fresh slices will be dropped directly into it after slicing.

The flume 3 contains a moving stream of heated liquid frying medium, e.g., oil, which oil is admitted through an oil inlet 2 at its infeed (upstream) end. The flume is oriented such that a rapidly moving stream of oil sweeps down the flume and into the main frying vessel 4. Preferably, an adjustable flap 10 is situated at the outlet end of the flume, which flap serves to variably control the oil level in the flume by damming the flow of oil out of the flume. The flap may, for example, comprise a stainless steel plate coated with polytetrafluoroethylene (Teflon).

The heated liquid frying medium in the flume is typically an oil or other fat suitable for frying which is liquid at the temperatures at which frying occurs. Suitable media may include lard, cottonseed oil, soybean oil, corn oil, peanut oil, palm oil, palmolein, wholly or partially hydrogenated derivatives of these, and mixtures of these. A particularly preferred oil consists essentially of peanut oil.

Streams of cooking oil are admitted at a plurality of oil inlet ports along the length of the apparatus, including the oil inlet 2 at the infeed end of the flume, the ports defining various frying zones. The oil which is supplied to these ports is heated remotely by recirculation from the exit end of the fryer via a pump 20 through a heat exchanger 21, for example, a gas fired boiler, where it is heated to a temperature of from above about 300° F (about 149° C) to about 320° F (about 160° C), and preferably between about 305° F (about 152° C), and about 315° F (about 157° C). Thus, the maximum temperature of the frying medium in the flume is from above about 300° F to about 320° F, and preferably between about 305° F and about 315° F. By "heated remotely" is meant that the heating of the oil occurs outside of the body of the fryer vessel, as distinguished from direct heating of the oil in the vessel by applying heat to the bottom of the vessel. Preferably, the oil circulates through a heat exchanger located external to the vessel.

In a preferred embodiment, the apparatus comprises at least three, and more preferably four, oil inlet ports. The first oil inlet port 2 is situated at the infeed end of the flume; the second oil inlet port 7, near the entrance end of the fryer; and the third oil inlet port 11, about two-thirds of the way down the length of the fryer. In the more preferred embodiment, a fourth port oil inlet port 9, situated intermediate between the second and third, may be used. The provision of the individual oil ports contributes to the ability of the method to achieve the desired temperature profile discussed below. Additionally, the downstream velocity that is imparted to the oil by the ports serves as the primary means for conveying the slices along the length of the apparatus.

In a preferred embodiment, a portion of the oil going into the first, second, third and/or optional fourth oil inlet ports, discussed supra, bypasses the heat exchanger and is recirculated directly to the fryer without being reheated. Liquid frying medium may, for example, be withdrawn from the frying vessel through an outlet located near the exit end of the vessel, and one portion of the withdrawn medium reheated via the heat exchanger and reintroduced by way of "hot" (i.e., reheated) oil line 8 through the oil inlet ports, and another portion of the withdrawn medium bypassing the heat exchanger so as not to be reheated, and recirculated by way of a "cold" (i.e., non-reheated) oil line 6 to the oil inlet ports. It should be noted that, although the drawing FIG. has been shown with the reheated oil and non-reheated oil entry points into each of the oil inlet ports parallel to one another for clarity, it is preferred that both reheated and non-reheated oil be admitted through a common entry point at each oil inlet port This combination of reheated and non-reheated oil allows for the temperature of frying medium entering a given oil inlet port to be controlled by effectively reducing the temperature of admitted oil relative to the temperature which would result if only reheated oil was admitted.

This feature allows for the establishment of a specific temperature profile necessary to produce a desired product having a well-defined taste and texture. This profile effect will be discussed in detail below. A further advantage offered by the provision of non-reheated oil to each of the three oil inlet ports is flow rate control. That is, a fixed quantity of oil can be admitted at each port without fixing the temperature of the oil if the relative proportions of reheated and non-reheated oil may be varied.

The flume is outfitted with means capable of agitating the very sticky potato slices as they are swept down the flume. The agitating means are essential to reduce agglomeration or clumping to an acceptable level, i.e., less than 4% by weight, preferably less than 2% by weight, and more preferably less than 1% by weight, based on the weight of completely fried potato chips. By "agglomeration" is meant stuck-together clusters of more than three slices, as distinguished from double or triple chips, of which up to 4% by weight may be tolerated. Without agitation, as many as 85% by weight of the slices will agglomerate, resulting in inadequate and incomplete frying of the finished potato chips. The agitating means also serve to dunk and separate the slices, ensuring even frying. The agitating means may comprise any apparatus capable of agitating the slices through most of the length of the flume. A particularly preferred agitating means is longitudinal paddle assemblies 5, as disclosed in commonly assigned U.S. Ser. No. 76,689, filed July 22, 1987, now U.S. Pat. No. 4,844,930, herein incorporated by reference. These paddle assemblies are arranged with their axes parallel to the lengthwise dimension of the flume and comprise a central shaft forming an axis and a number of polytetrafluoroethylene (Teflon) vanes which are attached to the shaft in a helical pattern. The paddles when in motion counter-rotate relative to one another and interdigitate, and are thus very effective in agitating the slices in the flume.

The flume then provides a two-fold purpose. It provides an increased cooking area relative to the area provided by the fryer per se, allowing the fryer to be operated at a lower temperature for a longer frying time, and at lower slice density. Secondly, its use of agitating means allows unwashed starchy slices to be employed without considerable sticking of the slices. Additionally, the paddle assemblies serve to meter the flow rate of potato slices out of the pre-frying zone; by changing the speed of rotation of the shafts or the pitch on the vanes of the paddle assemblies, it is possible to change the rate of flow of the slices through the zone.

The slices typically reside in the oil flume for from about 0.25 minutes to about 2.25 minutes.

As the slices travel down the length of the flume, the temperature of the oil in the pre-frying zone drops, usually to within the range of about 250° F (about 121° C) to about 275° F (about 135° C) and preferably about 258° F (about 126° C) to about 268° F (about 131° C).

When exiting the oil flume 3, the slices are considered to be in a "pre-fried" condition. By this is meant that they are surface or "case" hardened, i.e., that their surfaces are sufficiently dehydrated by the hot oil encountered in the pre-frying zone that a skin has formed on their surface, greatly reducing their likelihood of sticking to one another.

After exiting the oil flume, the pre-fried slices are conveyed into the fryer vessel 4 and into the second zone.

The second zone is defined as the zone between the first and second inlet ports. The slices typically remain in this zone for from about 3.5 minutes to about 5.75 minutes. This zone is preferably equipped with at least one drum paddle 13, of the type described in commonly assigned Application Ser. No. 76,897. The drum paddle 13 is oriented so that its axis is transverse to the lengthwise dimension of the vessel, and comprises vanes which extend substantially across the width of the vessel and are angularly spaced from each other about the axial shaft in a "paddlewheel"-like configuration.

The one or more drum paddles create a sweeping or scooping action to propel the slices downstream through the fryer, and additionally meter the movement of slices through this zone. The paddle 13 is preferably perforated so as not to obstruct oil flow.

Downstream the drum paddle or paddles 13 may, in one embodiment, be situated a series of longitudinal paddle assemblies 15 as described above. When used, these assemblies result in a certain desirable proportion of completely folded chips, i.e., from about 20% to about 50% and preferably from about 30% to about 40% by weight of the completely fried chips. By "completely folded" is meant that the two sides of the product chips are in actual contact with one another. When used, they are arranged in interdigitating, counter-rotating pairs, i.e., from two to twelve pairs, preferably two to six pairs. These assemblies, when used, are situated in a place along the course of the frying process such that slices which enter their locale are fried sufficiently so that they are no longer limp and are not yet rigid but are pliable and shape-holding.

In this region, the chips lose enough moisture so as to be shapeable under the compacting forces applied by these paddle assemblies. By the time the slices leave this area, they are capable of holding the shape imposed on them. The paddles in this region also perform an auger-like function and have the capability of both compacting the slices by the downward pushing of the paddles against the oil surface and by the folding of individual slices around individual paddle vanes and agitating to prevent agglomeration of the slices. Furthermore, these paddles serve to dunk slices as they traverse this region to promote more even frying. It is this capability which allows folded but nonagglomerated, evenly fried slices to be formed.

It is a surprising observation that these longitudinal paddle assemblies are effective at performing such diverse functions in their two possible environs. In the oil flume, they serve to prevent clumping without causing considerable folding in the resultant chips, whereas, if used in this first frying zone, they achieve a considerable amount (i.e., about 20% to about 50%) of folding in the completely fried product. This is explained by the fact that only in this limited (later) point along their frying cycle are the slices at the appropriate water content and degree of fry such that they are no longer limp and incapable of holding a shape, and not yet brittle and rigid, but rather are still pliable and shape-holding enough to retain a shape imposed by the mechanical forces of the paddle assemblies.

A further drum paddle 14 is preferably located at the end of this zone to meter movement out of this zone. Without this metering effect, flow of slices out of the second frying zone would be discontinuous, residence times would vary greatly, and uneven frying of slices would occur.

In a preferred embodiment, a fourth oil inlet port 9 may be used, preferably midway between the second and third, allowing for greater control of the temperature profile. Where both drum paddle or paddles and paddle assemblies are employed, this fourth oil inlet port serves to divide this zone into two subzones, one comprising a drum paddle or paddles and the other comprising longitudinal paddle assemblies.

The beginning of the third zone of the process is demarcated by the third oil inlet port 11. This third zone is equipped with a submerging conveyor 17. The slices are, at this point in the frying process, low enough in moisture to be buoyant when they enter the third frying zone; the submerging conveyor 17 therefore operates to retain the chips below the oil surface for a time sufficient to obtain completely fried potato slices having a final moisture content of below about 3% by weight, and preferably about 1% to about 2% by weight. If the moisture content of the finished chips is appreciably higher than about 2%, the chips will not be as crisp and will become stale after an unacceptably brief period of time. If the moisture content is lower than about 1%, no further incremental advantage is attained to offset the additional expenditure of energy, and the chips may have an increased oily taste or feel, and may taste burned or scorched. Preferably, the bottom run of the submerging conveyor is adjusted to be just at the oil surface to maximize the volume which the slices and oil may occupy to minimize breakage of the now-brittle slices. The slices typically remain in this zone for a period of time of between about 4.5 minutes and about 5.25 minutes. The total residence time from entry into the flume to take-out is typically between about 7 minutes and about 11 minutes.

An important feature of the present invention is the temperature profile characterizing the various zones of the process of the invention. The present process is characterized by a temperature profile wherein the temperature initially drops as uncooked potato slices and either reheated oil only or a mixture of reheated and non-reheated oil are added at the entrance end of the vessel, and subsequently rises as reheated oil, non-reheated oil, or a mixture of reheated and non-reheated oil is introduced at subsequent points along the fryer.

At the beginning of the pre-frying zone, either reheated oil only or a mixture of reheated and non-reheated oil is admitted through the first oil inlet port, located at the upstream end of the oil flume. By "reheated oil" is meant oil having gone from the exit end of the fryer (or, alternately, from any outlet point in the fryer) through pump 20 and heat exchanger 21 and back into the apparatus and having a maximum temperature typically in the range of from between above about 300° F (about 149° C) to about 320° F (about 160° C), and preferably between about 305° F (about 152° C) and about 315° F (about 157° C). By "non-reheated oil" is meant oil withdrawn from the exit end of the fryer and fed directly to the apparatus without having gone through the heat exchanger 21 and having a temperature in the range of between about 285° F (about 141° C) and about 300° F (about 149° C). The net effect is a maximum temperature in the first zone of up to about 320° F (about 160° C). To attain a maximum temperature in the first zone above about 300° F (about 149° C), it is preferable to add only reheated oil through this first oil inlet port 2.

The first zone is characterized by a rapid drop in oil temperature as heat from the oil is used to vaporize water from the highly moist uncooked slices. Toward the end of this zone, the temperature of the oil containing the slices has fallen to within the range of between about 250° F (about 121° C) and about 275° F (about 135° C), and preferably within the range of about 258° F (about 126° C) to about 268° F (about 131° C).

At the beginning of the second zone, additional oil is admitted to the fryer by way of oil inlet port 7. Either a mixture of reheated and non-reheated oil, or all reheated or all non-reheated oil is added to the fryer, as is necessary to maintain the zone temperature in the desired range, i.e., between about 240° F (about 116° C) and about 265° F (about 129° C), and preferably between about 245° F (about 118° C) and about 255° F (about 124° C). The net effect is that the temperature of this second zone is at least about 35° F (about 19° C) lower than the maximum temperature of the first zone. Optionally, another stream of oil may be admitted through the aforedescribed fourth oil inlet port 9 to aid in maintaining the temperature in the recited range.

At the beginning of the third zone, reheated oil is again introduced to the fryer and a maximum temperature for this zone of between about 285° F (about 141° C) and about 310° F (about 154° C), and preferably between about 290° F (about 143° C) and about 300° F (about 149° C), is eventually attained. In an alternate embodiment, a mixture of reheated and non-reheated oil may be admitted through the "hot" oil line 8 and "cold" oil line 6, respectively, to this zone as in the first frying zone. In a preferred embodiment, only reheated oil is admitted to this port; in fact, a supplemental influx of reheated oil may be needed to boost the temperature in the zone to within the desired range. To further supplement this hot oil influx in order to get the temperature up to the high level needed to fry-out the remaining moisture in the chips, additional hot oil may be poured from an optional slotted pipe 16 positioned above the submerging conveyor. The oil percolates through the conveyor belts of the submerging conveyor 17 which resides in this zone, down to the chips underneath. In another embodiment, all of the reheated oil which is to be added at this point may be added through this pipe, rather than merely as a supplement. However, when added in this fashion, the percolating oil may be prone to breakdown and oxidation. Therefore, a widened slot relative to the width of the slots comprising the other inlet ports, or multiple slots (not shown) comprising the third oil inlet port 11 on the bottom of the fryer could accomplish the same effect without damaging the oil, and may be preferable. In any case, the maximum temperature in the third zone should be at least about 20° F (about 11° C) higher than the temperature of the oil in the second zone.

After completion of frying in this third zone, the slices, now rigid and brittle and having a moisture (water) content below about 3%, and preferably between about 1% and about 2%, are removed from the liquid frying medium via a take-out conveyor 19. Optionally, a chip detangler (not shown) impacts the slices as they leave the submerging conveyor 17 to dislodge any entangled (though non-agglomerated) chips.

It is a surprising advantage of this invention that the potato chips produced in accordance with this invention have a reduced oil content relative to conventionally produced or kettle-style potato chips, despite their relatively long residence time in the oil, i.e., at total of about 7 minutes to about 11 minutes. The potato chips prepared in accordance with the above embodiment typically contain between about 23% and about 26% by weight of oil, based on total fried potato chip weight. This oil content is about 25% by weight lower than kettle-style chips prepared by prior art processes. If the above described process is combined with oil reducing steps known in the art, such as centrifugation or treatment of the surface by blowing excess surface oil off with a gas such as superheated steam, the oil content of the chips may be reduced even further, such as by 33% by weight or more, so as to satisfy the Food and Drug Administration's (F.D.A.) definition of a "reduced oil" chip.

In another embodiment, however, the completely fried potato chips are subjected to an additional step which topically supplies additional hot oil to the chips from a source external to the vessel as they are being conveyed out of the vessel on the take-out conveyor. This oil may be added in the form of a spray, "curtain" or cascade of hot oil, such as by way of optional oil spray 18, which oil is reheated via the heat exchanger. In this embodiment, the resulting chips have an oil content in the range of about 34% to about 36% by weight.

The potato chips so produced may the be seasoned with, for example, salt or other optional seasonings or flavorings. The optionally seasoned chips are then packaged by methods known in the art.

The chips which are produced in accordance with this invention are distinctive in texture, taste, and, in one embodiment, oiliness or "mouth feel" relative to prior art potato chips. The chips typically retain more inherent potato flavor due to the retention of surface starch and other surface components and are discernably crisper than chips prepared in other kettle-style processes. The chips have a notably oilier mouth feel relative to other chips of similar oil content, even in the reduced oil embodiment, because a relatively high percentage of the oil resides on the surface of the chips.

The present invention may be further understood by reference to the following Examples which are meant to be illustrative and are not to be construed as limiting the scope of the instant invention as defined in the appended claims. The following Examples were conducted on a prototype fryer which has the same basic mode of operation as the commercial scale fryer shown in the drawing and described herein. However, various modifications to the structure shown and described herein exist and the essential features of the fryer used in each Example are set forth in the beginning of that Example. All parts and percentages are to be construed as by weight and all temperatures as degrees Fahrenheit unless otherwise specified.

EXAMPLE 1

A frying apparatus containing a vessel whose internal dimensions were about 21 to 22 feet long and 20 inches wide, connected at its upstream end to an oil flume whose dimensions were about 15 feet long and 12 inches wide, and which included the following sequence of elements was used:

(1) the flume included a pair of counter-rotating, interdigitating longitudinal paddle assemblies, and a Teflon-coated stainless steel flap, to control oil depth, raised 3" from the bottom of the flume at its end;
(2) a perforated Teflon drum paddle situated at the infeed end of the fryer;
(3) a second counter-rotating pair of longitudinal paddle assemblies downstream of (2) having forward augering motion and a negative pitch;
(4) a second, metal, drum paddle similar in design to (2) and downstream of (3);
(5) a submerging conveyor;
(6) an oil-carrying slotted pipe above the submerging conveyor;
(7) an external oil sprayer; and
(8) a take-out conveyor.

Also included were a slicer positioned above the upstream end of the flume and a heat exchanger external to the fryer. Provision was made for supplying either reheated, recirculated oil or non-reheated, recirculated oil or a mixture of both to all of four oil inlet ports located along the floor or wall of the apparatus in the following positions: (a) at the inlet end of the flume; (b) at the inlet end of the frying vessel; (c) below the second pair of longitudinal paddle assemblies; and (d) below the submerging conveyor. Six temperature probes were located in the following positions: (i) at the exit end of the oil flume (hand-held probe); (ii) immediately before the first drum paddle in the fryer; (iii) at a point about ¼ to ⅓ of the way from the upstream end of the longitudinal paddle assemblies; (iv) at a point about ⅔ of the way from the upstream end of the longitudinal paddle assemblies; (v) between the longitudinal paddle assemblies and the second drum paddle; and (vi) between the submerging a take-out conveyors. Additionally, a "gauge" temperature, or the temperature of oil added to the flume, was measured.

Florida Atlantic potatoes containing 20.8% by weight dry matter which had been previously peeled and washed were fed to an Urschel slicer set at 0.070 inches and slices 0.064 inches thick were actually obtained. The slices were allowed to fall directly into the flume, without washing, at its upstream end. The flume and frying vessel each contained 100% peanut oil having an average depth of 4.5 inches in the flume and 7.75 inches in the vessel. The oil was continuously recycled by removing and recycling oil from the take-out end of the apparatus to the four oil inlet ports through a gas boiler heat exchanger set at 305° F (about 152° C) (oil output temperature).

The longitudinal paddle assemblies in the fryer were situated such that their upstream end was about 3.5 inches from the floor and their downstream end about 5.0 inches therefrom. The longitudinal paddle assemblies in the flume were set at about 19 rpm; the first drum paddle at about rpm; the longitudinal paddle assemblies in the fryer at between about 24.5 rpm and 51 rpm; the second drum paddle at about 1 rpm; the submerging conveyor at about 36 inches per minute and the take-out conveyor at about 22 inches per minute.

Reheated oil was admitted through the oil inlet ports in the flume and below the submerging conveyor and from the slotted pipe positioned over the submerging conveyor. Non-reheated oil was admitted through the oil inlet port (b) at the inlet end of the fryer.

The following temperature readings were taken at each of the six probes (i) 268° F (about 131° C); (ii) 261° F (about 127° C); (iii) 257° F (about 125° C); (iv) 251° F (about 122° C); (v) 249° F (about 121° C) and (vi) 290° F (about 143° C). The gauge temperature was 305° F (about 152° C).

Dwell times of the slices in various zones, all measured from entry into the flume, were observed to be as follows: (a) to the first drum paddle, between about 60 seconds and about 115 seconds; (b) to the longitudinal paddle assemblies in the fryer, between about 105 seconds and about 160 seconds; (c) to the second drum paddle, between about 190 seconds and about 400 seconds; (d) to the submerging conveyor, about 255 seconds to about 440 seconds; (e) to the take-out conveyor, about 340 seconds to about 535 seconds; and (f) out of the fryer, about 385 seconds to about 595 seconds.

A production rate of about 151.5 pounds per hour of chips was obtained, and the resulting batch of chips contained (by weight) 53.8% flat chips; 40.6% folded chips; 4.9% double chips; 0.7% triple chips, no clusters and no wet chips. The chips contained 2.0% by weight moisture (water) and 31.8% oil.

EXAMPLE 2

An apparatus similar to the one described in Example 1 was used, except that the longitudinal paddle assembly speed in the flume was reduced to about 14 rpm, resulting in a dwell time in the flume of about 95 seconds. The longitudinal paddle assemblies in the fryer operated at 51 rpm.

The following temperature profile was observed at the probes in the positions designated in Example 1: (i) 262° F (about 128° C); (ii) 258° F (about 126° C); (iii) 253° F (about 123° C); (iv) and (v) 247° F (about 119° C); and (vi) 287° F (about 142° C). The heat exchanger was set at 305° F (about 152° C) to obtain an actual gauge temperature of 303° F (about 151° C).

The dwell times to the points designated (a)-(f) in Example 1 were as follows in this Example: (a) about 65 seconds to about 140 seconds; (b) about 110 seconds to about 190 seconds; (c) about 255 seconds to about 490 seconds; (d) about 305 seconds to about 530 seconds; (e) about 395 seconds to about 630 seconds; and (f) about 435 seconds to about 680 seconds.

A yield of 146 pounds of chips per hour was recovered. The chips which resulted comprised, by weight, 45.7% flat chips; 48.7% folded chips; 4.1% double chips; 1.6% triple chips, no clusters and no wet chips. The sample had a water content of 2.0% by weight and an oil content of 30.8% by weight.

EXAMPLE 3

An apparatus similar to the one described in Example 1 was again used, with some changes, including that the longitudinal paddle assemblies in the fryer were adjusted such that they were 5.5 inches from the bottom of the fryer at their downstream end. Also, these paddle assemblies had a negative pitch. A raw feed belt was used. Additionally, in this Example, reheated oil was admitted only through the flume, the last oil inlet port, and the pipe over the submerging conveyor. The paddles in the flume were set at about 14 rpm; both drum paddles at about 1 rpm; the longitudinal paddle assemblies in the fryer at about 51 rpm; the submerging conveyor at about 36 inches per minute; and the take-out conveyor at about 22 inches per minute. The heat exchanger was set at 305° F (about 152° C) (gauge). The following temperature profile was observed: (i) 264° F (about 129° C); (ii) 254° F (about 123° C); (iii) 250° F (about 121° C); (vi) 247° F (about 119° C); (v) 245° F (about 118° C); and (vi) 288° F (about 142° C). A yield of about 162 pounds of potato chips per hour was collected. The yield comprised, by weight, 63.2% flat chips; 32.5% folded chips; 3.4% double chips and 0.9% triple chips. The chips, water content was 2.0% by weight and oil content was 25.9% by weight.

EXAMPLE 4

The equipment was as described in Example 3, and the procedure similar except for the following. Arkansas Atlantic potatoes having 22.6% by weight dry matter were sliced at a knife setting of 0.069 inches, to obtain an actual slice thickness of about 0.063 inches. The paddle settings used were the same except that the first drum paddle was sped up to about 1.5 rpm, and the submerging conveyor was slowed down to 32 inches per minute. The heat exchanger was set at about 305° F (about 152° C). The temperature profile was as follows: (i) 258° F (about 126° C); (ii) 248° F (about 120° C); (iii) and (iv) 245° F (about 118° C); (v) 243° F (about 117° C); and (vi) 288° F (about 142° C). A yield of 165 pounds of potato chips per hour was collected, comprising, by weight, 60.4% flat chips; 35.0% folded chips; 3.8% double chips; and 0.8% triple chips.

EXAMPLE 5

The apparatus and procedure of the previous Example were used, except that the temperature of the heat exchanger was increased to 315° F (about 157° C). No temperature profile was recorded, but the chips produced were analyzed and found to comprise, by weight, 51.6% flat chips; 38.0% folded chips; 7.9% double chips and 2.6% triple chips. The chips had a moisture content of 1.7% by weight and an oil content of 23.7% by weight.

EXAMPLE 6

Apparatus and procedure similar to that described in Example 5 was again used except that the longitudinal paddle assemblies in the fryer had no pitch and were slowed down to about 22 rpm. The submerging conveyor was sped up to 38 inches per minute. The heat exchanger was set at 310° F (about 154° C). The following temperature profile was recorded: (i) 263° F (about 128° C); (ii) 256° F (about 124° C); (iii) 251° F (about 122° C); (iv) 247° F (about 119° C); (v) 244° F (about 118° C); and (vi) 297° F (about 147° C). The chips which resulted (production rate: 159 pounds per hour) had a water content of 1.5% by weight and an oil content of 25.3% by weight. 66.4% flat chips, 28.2% folded chips, 3.6% double chips, 1.5% triple chips and 0.3% clusters were included in this yield, all percentages being by weight.

EXAMPLE 7

Again, similar apparatus to that used in the previous examples was employed, except that, inter alia, the longitudinal paddle assemblies in the fryer were sped up to about 24.5 rpm. The heat exchanger was set at 315° F (about 157° C). Additionally, an oil spray device capable of spraying hot oil was positioned about twelve inches from where the chips emerged from the fryer, at the lower end of the take-out conveyor. The following temperature profile was recorded: (ii) 264° F (about 129° C); (iii) 261° F (about 127° C); (iv) 250° F (about 121° C); (v) 249° F (about 121° C); and (vi) 297° F (about 147° C). No measurement was recorded in the oil flume (probe (i)). The potato chips which resulted contained 0.8% by weight moisture; 36.8% by weight oil; 43.6% by weight flat chips; 49.0% by weight folded chips; 6.7% by weight doubles and 0.7% by weight triples.

COMPARATIVE EXAMPLE

A fryer having three drum paddles; a set of longitudinal paddle assemblies; a fourth drum paddle; a submerging conveyor and a take-out conveyor but no oil flume was employed. Potatoes were sliced and dropped directly, without washing, into the upstream end of the fryer. The resulting product issued from the fryer in clusters so large that they were not further analyzed.

CONCLUSION

While the invention has been disclosed in this patent application by reference to the details of preferred embodiments of the invention, it is to be understood that the disclosure is intended in an illustrative rather than a limiting sense, as it is contemplated that modifications may readily occur to those skilled in the art, within the spirit of the invention and the scope of the appended claims.

What is claimed is:

1. A continuous method for making potato chips by conveying unwashed potato slices through a heated liquid frying medium, said method comprising the following steps:
    conveying uncooked, unwashed potato slices through a first zone comprising an oil flume containing agitating means for pre-frying at a maximum zone temperature in the range of from above about 300° F (about 149° C) to about 320° F (about 160° C) with agitation sufficient to prevent substantial agglomeration to form a dehydrated skin on the surface of said slices;
    conveying said surface dehydrated potato slices through a second zone at a zone temperature in the range of about 240° F (about 116° C) to about 265° F (about 129° C) for a time period sufficient to impart a pliable, shape-holding consistency to the potato slices;
    conveying the potato slices through a third zone at a maximum zone temperature in the range of about 285° F (about 141° C) to about 310° F (about 154° C) for a time period sufficient to produce rigid, completely fried potato chips; and
    removing the completely fried potato chips.

2. The continuous method according to claim 1 wherein said completely fried potato chips have an oil content in the range of about 23% to about 26% by weight, based on total fried chip weight.

3. The continuous method according to claim 1 further comprising supplying additional heated liquid frying medium to the completely fried potato chips from a source external to said vessel after removing said completely fried potato chips from said vessel.

4. The continuous method according to claim 1 wherein said completely fried potato chips are subjected to an oil spray or curtain and have an oil content in the range of about 34% to about 36% by weight, based on total chip weight.

5. The continuous method according to claim 1 wherein the oil in said liquid frying medium comprises peanut oil.

6. The continuous method according to claim 1 wherein the oil in said second zone is maintained in a temperature range of about 245° F (about 118° C) to about 255° F (about 124° C).

7. The continuous method according to claim 1 wherein said third zone is maintained in a temperature range of about 290° F (about 143° C) to about 300° F (about 149° C).

8. The continuous method according to claim 1 wherein less than about 2% by weight of said completely fried chips are agglomerated.

9. The continuous method according to claim 1 wherein the oil in said first zone is maintained in a temperature range of about 250° F (about 121° C) to about 320° F (about 160° C).

10. The continuous method according to claim 9 wherein the oil in said first zone is maintained in a temperature range of about 258° F (about 126° C) to about 315° F (about 157° C).

11. A method for operating a continuous frying apparatus, said frying apparatus comprising an oil flume containing agitating means for pre-frying unwashed, uncooked potato slices and an elongated frying vessel having an entrance end for receiving pre-fried potato slices and an exit end from which completely fried potato chips are removed, means for supplying a heated liquid frying medium to said vessel, and means for conveying potato slices lengthwise along said apparatus from said flume to the exit end of said apparatus, said method comprising the following steps:

- introducing a first stream of liquid frying medium into a first inlet port in said oil flume located near the entrance end of the flume;
- introducing unwashed, uncooked potato slices into said oil fume while agitating sufficiently to prevent substantial agglomeration of said slices upon exiting said flume;
- introducing a second stream of liquid frying medium into the frying vessel through a second inlet port located near the entrance end of the vessel to define the start of a second zone;
- conveying potato slices exiting said flume into said second zone;
- introducing a third stream of liquid frying medium into the vessel through a third inlet port located downstream of the second inlet port to define the start of a third zone;
- conveying potato slices exiting said second zone into said third zone;
- controlling the flow rate and temperature of the first stream of liquid frying medium such that the maximum temperature attained in the pre-frying zone is maintained within a first temperature range;
- controlling the flow rate and temperature of the second stream of liquid frying medium such that the second zone is maintained within a second temperature range at least about 35° F (about 19° C) lower than said first temperature range;
- controlling the flow rate and temperature of the third stream of liquid frying medium such that the maximum temperature of the third zone is maintained within a third temperature range at least about 20° F (about 11° C) higher than said second temperature range; and
- removing completely fried potato chips from the vessel at the exit end of said apparatus.

12. The continuous method according to claim 11 further comprising the steps of
- withdrawing the liquid frying medium from the vessel through an outlet located near the exit end of the vessel;
- reheating a first portion of the liquid frying medium withdrawn from the vessel and reintroducing the reheated frying medium through said first, second and third inlet ports;
- recirculating a second portion of the liquid frying medium withdrawn from the vessel to at least one of said first, second and third inlet ports without reheating in order to reduce the temperature of the frying medium entering the apparatus at said inlet port or ports.

13. The continuous method according to claim 11 wherein said completely fried potato chips have an oil content in the range of about 23% to about 26% by weight, based on total chip weight.

14. The continuous method according to claim 11 further comprising supplying additional heated liquid frying medium to he completely fried potato chips from a source external to said vessel after removing said completely fried potato chips from said vessel.

15. The continuous method according to claim 14 wherein said completely fried potato chips have an oil content in the range of about 34% to about 36% by weight, based on total chip weight.

16. The continuous method according to claim 11 wherein said liquid frying medium comprises peanut oil.

17. The continuous method according to claim 11 wherein said agitating means comprises longitudinal paddle assemblies.

18. The continuous method according to claim 11 wherein less than about 2% by weight of said completely fried chips are agglomerated.

19. The continuous method according to claim 11 wherein between about 20% and about 50% by weight of completely fried potato chips are folded in said second zone.

* * * * *